Oct. 18, 1960
G. A. WAHLMARK
2,956,845
PISTON
Filed May 9, 1956
4 Sheets-Sheet 1
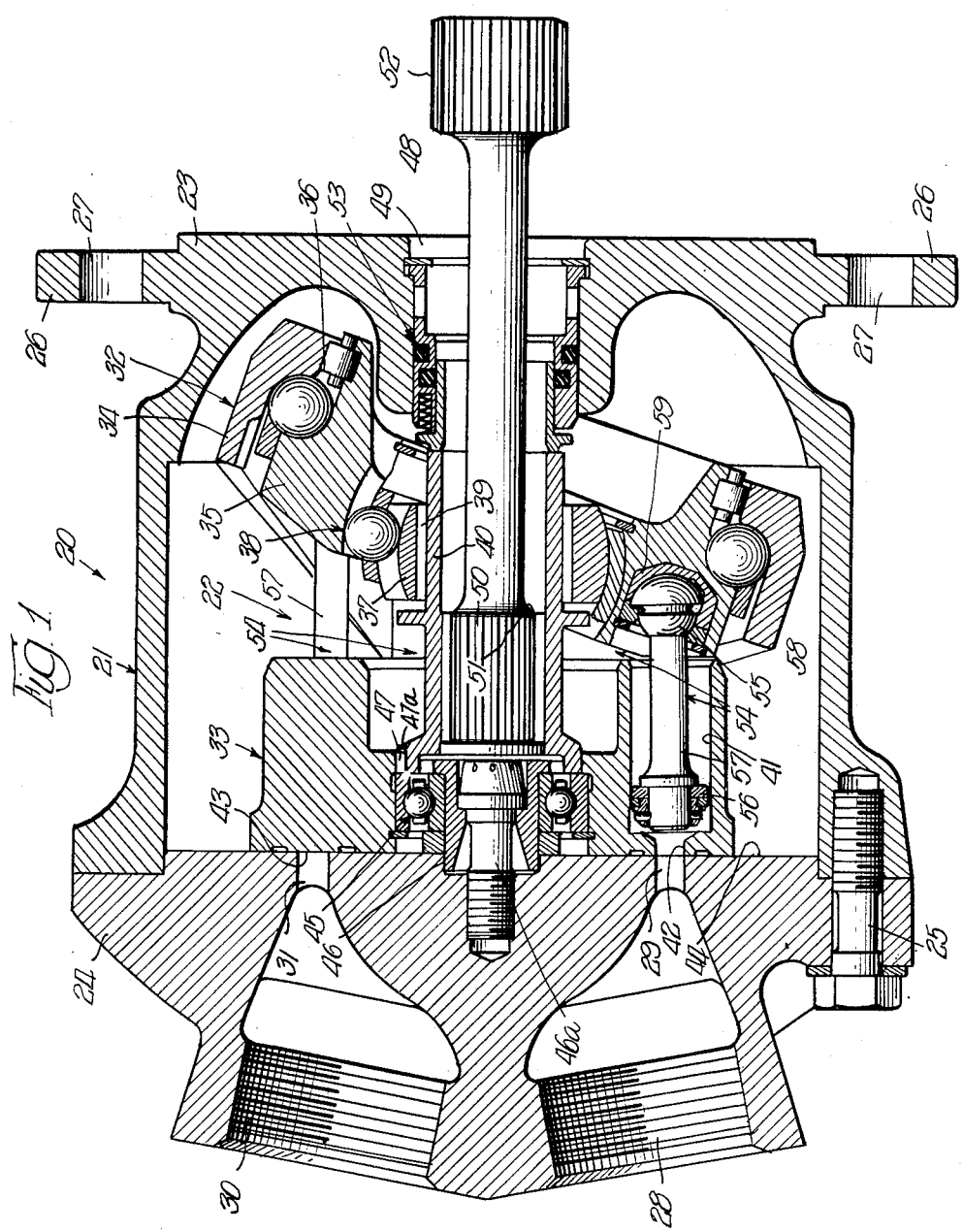
INVENTOR.
Gunnar A. Wahlmark,
BY
Wilkinson, Huxley, Byron & Hume
ATTYS.

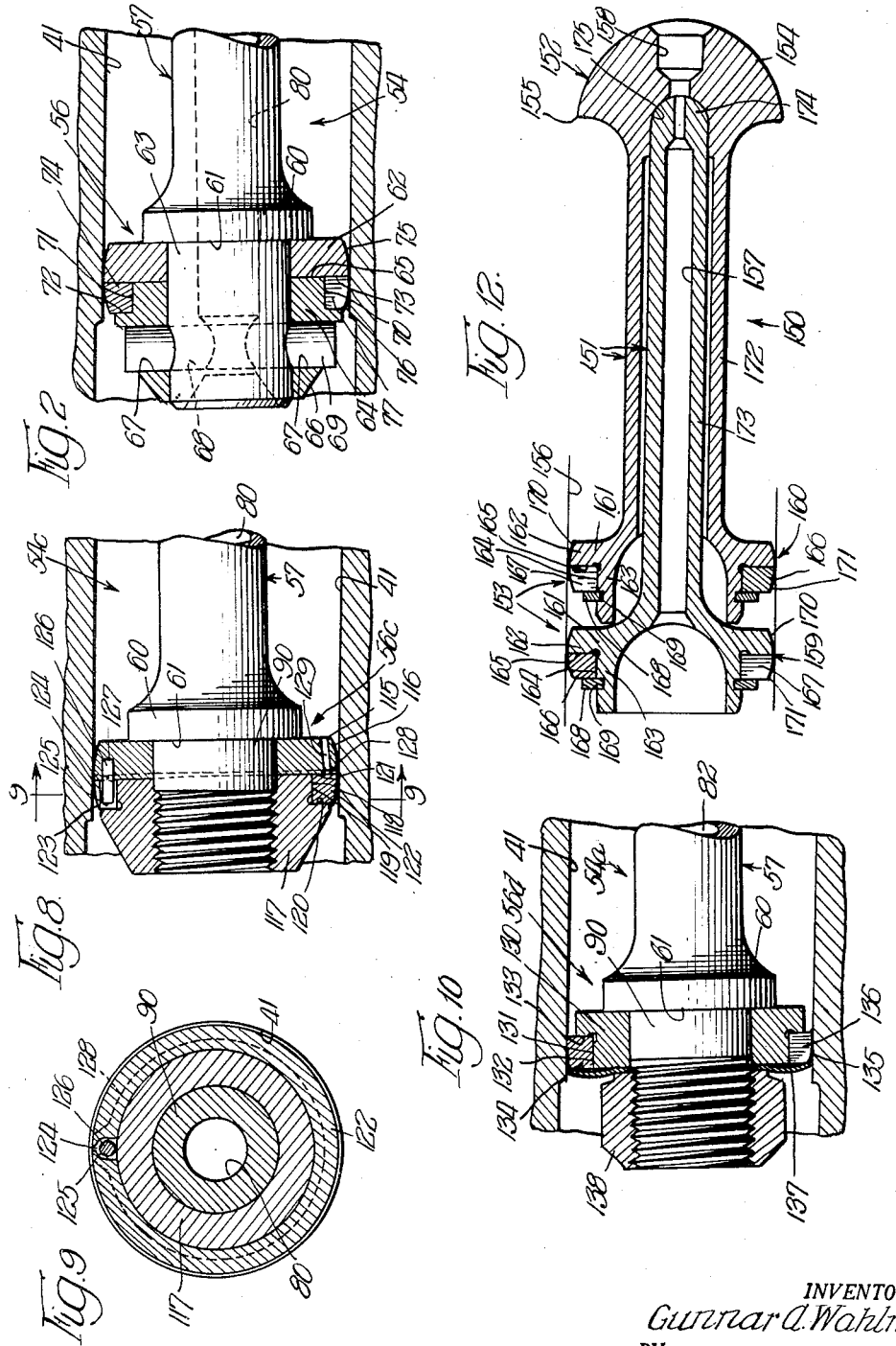

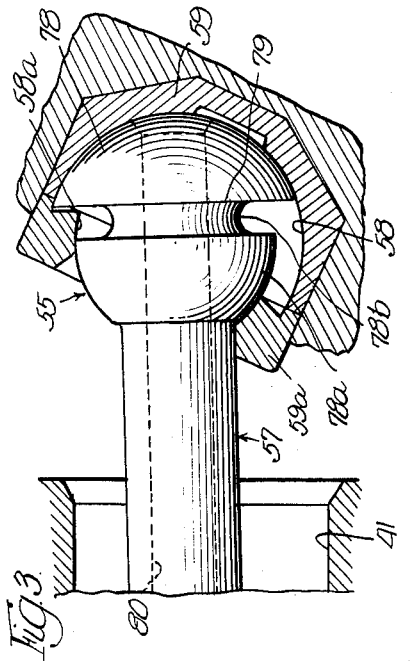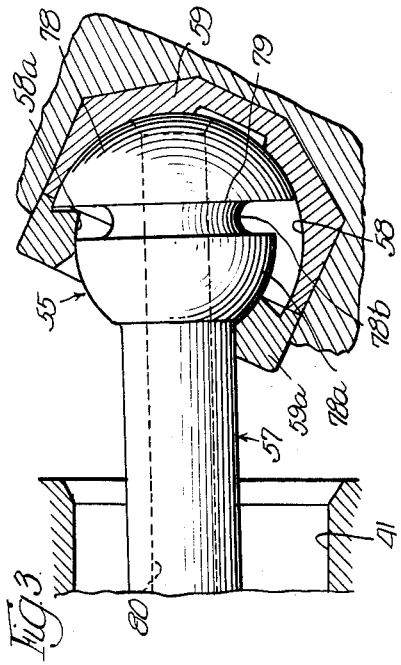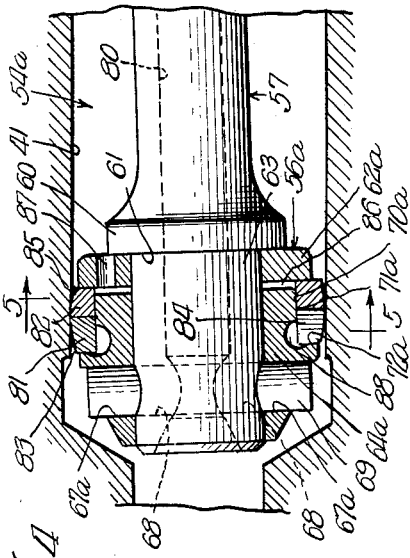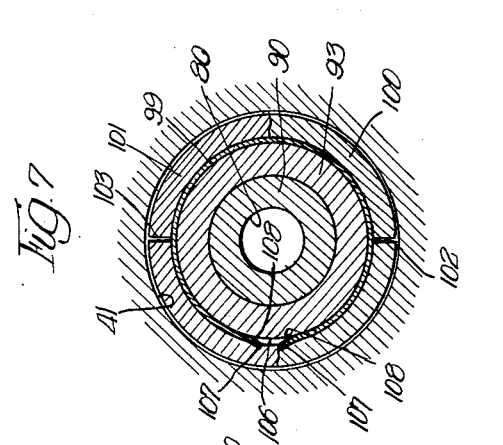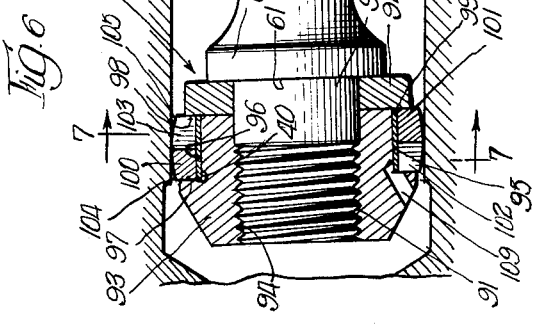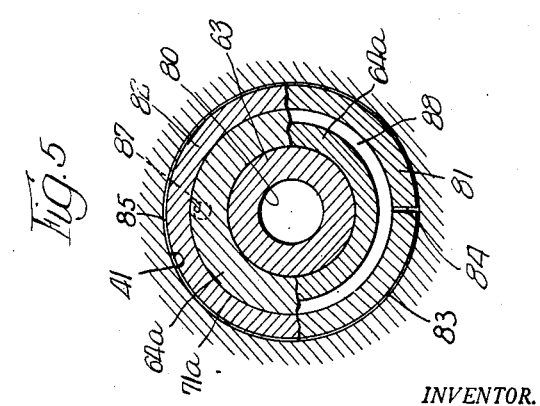

Oct. 18, 1960
G. A. WAHLMARK
2,956,845
PISTON
Filed May 9, 1956
4 Sheets-Sheet 4
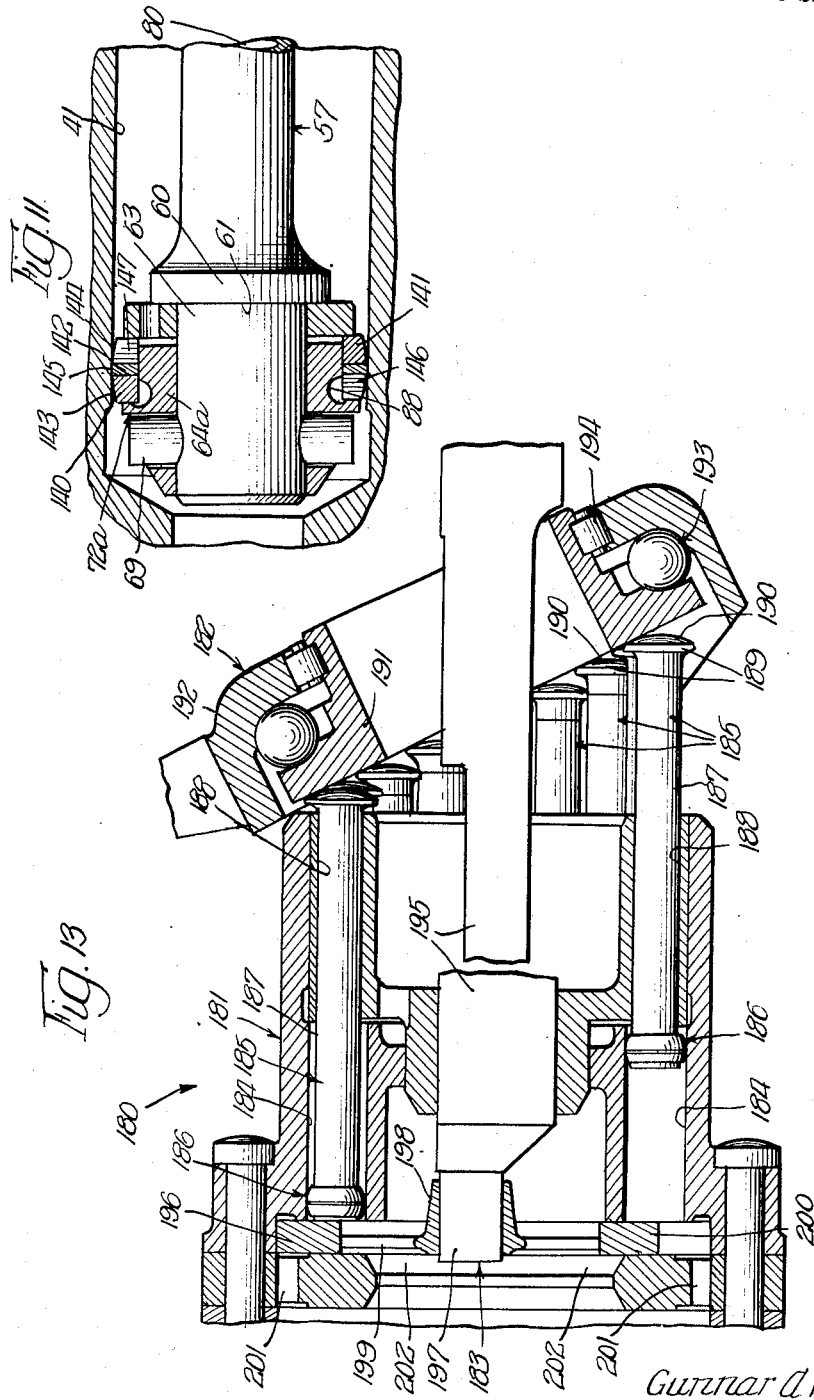
INVENTOR.
Gunnar A Wahlmark,
BY

United States Patent Office 2,956,845
Patented Oct. 18, 1960

2,956,845

PISTON

Gunnar A. Wahlmark, 211 S. Rockford Ave., Rockford, Ill.

Filed May 9, 1956, Ser. No. 583,797

28 Claims. (Cl. 309—4)

This invention relates to improvements in piston members. More particularly, the invention relates to improvements in the piston members employed in swash plate or wobble plate hydraulic devices.

In conventional piston design a piston head of substantial length is connected to a smaller diameter piston rod, sometimes fixedly, sometimes pivotally and sometimes universally, depending upon the application.

Ordinary piston and cylinder combinations are manufactured to close tolerances in order to prevent leakage and to prevent piston slap. Such close tolerance constructions are subject to excessive wear or seizing when abnormally high temperatures or sudden changes in temperature are encountered. Conventional pistons are ordinarily relatively heavy and thus aggravate problems of bearing wear, vibration, and the like.

While various devices such as conventional piston rings, expandable piston heads and the like have been provided in an effort to compensate for wear, the wear compensation problem has by no means been solved. When piston heads are pivotally or universally connected to piston rods, lubrication problems are introduced which are particularly acute when the angular movements of the piston rods are slight. One of the more important problems in connection with piston and cylinder design have been the prevention of leakage, while at the same time reducing piston friction.

All of these difficulties and certain specialized difficulties are encountered in connection with pistons employed in swash plate or wobble plate hydraulic devices. An axial swash plate or wobble plate hydraulic device such as a pump or a hydraulic power transmission employs pistons which are reciprocated by means of a circular plate mounted obliquely on a rotatable shaft. If the obliquely mounted plate is connected to the shaft by means of a universal joint and the pistons are rotated with the plate, then the device will be hereinafter referred to as "swash plate" device. If the plate is obliquely mounted to oscillate or "wobble" as the shaft is rotated and the pistons do not rotate with the plate, then the device will be called a "wobble plate" device. In the past all such devices have been generically referred to as "swash plate" devices, but in recent practice the above precise terminology has been adopted to differentiate between the two types.

In a swash plate device where the pistons are rotated with the plate, serious difficulties have been encountered with respect to piston and cylinder wall wear caused by centrifugal force. Furthermore, rotation of the pistons with the plate introduces slight changes in the universal angularity between the axes of the pistons and the axis of the shaft, and these angularity changes necessitate employment of universal connections between the piston rods and the piston heads. Since the changes in angularity are slight and the loads against the piston heads are quite large, serious difficulties in lubrication are encountered in such universal connections.

In all swash plate or wobble plate devices utilizing conventional pistons the piston heads must be of substantial axial length, thus introducing difficulties in construction and operation due to close tolerances necessitated by high hydraulic working pressures. Close tolerance cylinder and piston combinations are difficult and expensive to manufacture and are subject to excessive wear or seizing when abnormally high hydraulic fluid temperatures or sudden changes in temperature are encountered. Where a universal connection is utilized between the piston head and the piston rod, the piston cannot be completely pressure balanced between the swash plate and the opposite end of the piston head, since the joint must necessarily be smaller than the outside piston diameter.

A principal object of the present invention is to provide an improved piston member in which the conventional piston head is replaced by a spherically surfaced member or members.

An important object of the invention is to provide improved pistons for use in swash plate or wobble plate hydraulic devices.

Another object of this invention is to provide a swash plate or wobble plate hydraulic device embodying pistons which employ spherically surfaced piston rings.

A further object is to provide an improved piston device capable of substantial change in angularity without leakage or excessive wear.

Still another object of the invention is to provide an improved and simplified piston device which provides a line contact seal rather than the conventional surface contact.

Still a further object of the invention is to provide a piston embodying means compensating for piston and cylinder wall wear.

An additional object of the invention is to provide a piston device which is substantially lighter than a conventional piston of similar capacity.

A further object of the invention is to provide in a hydraulic device a piston which is capable of universal pivoting while maintaining complete hydraulic balance.

Another object of the invention is to provide a piston device employing a piston ring which is pressure-locked in proper sealing position on each power or pump stroke of the piston and is freed on the exhaust or inlet stroke of the piston.

A still further object of the invention is to provide an improved universal ball end for connecting a piston rod to an actuating member.

Other objects, features and advantages will be apparent from the following detailed description taken in conjunction with the accompanying drawings, in which:

Figure 1 is a sectional view of an axial swash plate pump embodying an improved piston according to the present invention;

Figure 2 is an enlarged fragmentary sectional view of the head portion of the piston shown in Figure 1;

Figure 3 is an enlarged fragmentary view of the universal ball end portion of the piston shown in Figure 1;

Figure 4 is an enlarged fragmentary sectional view of the head portion of another embodiment of a piston as shown in Figure 1;

Figure 5 is a sectional view taken along line 5—5 of Figure 4;

Figure 6 is an enlarged fragmentary sectional view of the piston head portion of a third embodiment of the present invention;

Figure 7 is a sectional view taken along line 7—7 of Figure 6;

Figure 8 is an enlarged fragmentary sectional view of the piston head portion of a fourth embodiment of the invention;

Figure 9 is a sectional view taken along line 9—9 of Figure 8;

Figure 10 is an enlarged fragmentary sectional view of the piston head portion of a fifth embodiment of the invention;

Figure 11 is an enlarged fragmentary sectional view of the piston head portion of a sixth embodiment of the invention;

Figure 12 is an enlarged sectional view of a seventh embodiment of the invention utilizing a double piston head portion; and Figure 13 is a fragmentary sectional view of a wobble plate pump utilizing a piston according to the present invention.

In Figure 1 is illustrated an axial swash plate hydraulic device in the form of a variable displacement pump 20. The pump 20 includes a housing or casing 21 containing swash plate hydraulic pumping mechanism 22.

The housing 21 includes an open ended casing 23 having its open end closed by a cover plate 24. The cover plate 24 may be fixedly secured to the casing 23 by means of a plurality of bolts 25. The casing 23 is provided with an attachment flange 26 containing attachment holes 27 whereby the housing 21 may be secured to a driving structure such as an aircraft engine (not shown).

The cover plate 24 is provided with an outlet or pressure aperture 28 which includes an outlet or pressure port 29, and an inlet or suction aperture 30 which includes an inlet or suction port 31. The inlet port may be connected to an engine oil or hydraulic fluid source (not shown) and the outlet aperture 28 may be connected to the pressure side of a hydraulic system in an aircraft or guided missle, for example (not shown).

The pumping mechanism 22 includes an obliquely mounted, axially oscillatable periphery plate assembly 32 and a cylinder block 33. The plate assembly 32 is of the type referred to as a "swash plate" and includes an outer non-rotating tiltable displacement control ring 34, within which a piston socket ring 35 is rotatably secured by means of an anti-friction thrust-bearing 36. The piston socket ring 35 is universally tiltably connected to an inner ring 37 by means of a universal joint 38 which is preferably of the constant velocity type as shown. The inner ring 37 is connected by means of splines 39 to a drive sleeve 40.

The cylinder block 33 contains a plurality of pumping cylinders or chambers 41 (one shown) which are disposed in radially spaced relation. The particular pump 20 is provided with nine pumping cylinders. The cylinders 41 are open at their ends facing the swash plate assembly 32 and are provided with cylinder feed ports 42 at their opposite ends. The cylinder block 33 has a radial cylinder feed port face 43 disposed in rotating slidable abutment against an inner radial face 44 of the cover plate 24.

The outlet port 29 and the inlet port 31 in the cover plate 24 may be of arcuate configuration (not shown) and are arranged so that the feed ports 42 each communicate with either the inlet port or the outlet port, or are blocked by the lands in between provided by material of the cover plate between the ports. The ports are arranged so that the respective feed ports 42 ordinarily communicate with either the outlet port 29 or the inlet port 31.

The cylinder block 33 is rotatably supported with respect to the cover plate 24 by means of an anti-friction bearing 45 which has its inner race secured to a clamping lug 46 which in turn is connected to the cover plate 24 by means of a bolt 46a. Internal splines 47 formed on the cylinder block 33 are engaged with external splines 47a formed on the end of the drive sleeve 40 whereby the cylinder block is adapted for being rotated by the drive sleeve.

For rotating the drive sleeve 40, a drive shaft 48 is inserted through an axial aperture 49 formed in the casing 23. An externally splined inner end 50 of the drive shaft is engaged with internal splines 51 formed in the drive sleeve. The outer end of the drive shaft 48 is provided with external splines 52 which are adapted for engagement with an auxiliary drive mechanism of an aircraft engine, for example (not shown). In order to prevent leakage from inside the casing 23 through the aperture 49, rotating seal means 53 are disposed between the portion of the casing 23 defining the aperture 49 and the end of the drive sleeve 40.

According to the present invention, a plurality of pistons 54 are operatively disposed in the pumping cylinders 41. Each of the pistons 54 includes a universal ball end portion 55 at one end, a head portion 56 at the other end, and a piston rod portion 57 therebetween. The ball ends 55 are universally disposed in respective mating universal ball sockets 58 provided in radially spaced relation about the piston socket ring 35 of the swash plate assembly 32. The ball sockets 58 are formed in hardened socket liners 59 which are fixedly secured in the ring 35. The head portions of the pistons 54 are disposed in pumping relation within the respective pump cylinders 41.

From the description thus far, it will be seen that rotation of the drive shaft 48 drives the sleeve 40 and causes concurrent rotation of the cylinder block 33 and the piston socket ring 35. As these portions of the pumping mechanism 22 are rotated, the pistons 54 are reciprocated in the cylinders 41 due to the oblique mounting of the plane of the swash plate assembly 32 with respect to the axis of rotation which causes any given point on the peripheral portion of socket ring 35 to oscillate axially. The stroke of the pistons 54, and consequently the displacement of the pump, depends upon the angle between the swash plate plane and the axis of rotation. If the plane of the swash plate were perpendicular to the axis of rotation, the pistons 54 would not reciprocate and the pump displacement would be zero. As the plane of the swash plate assembly is canted more and more with respect to the axis of rotation, the pump displacement increases. A pump such as that illustrated in Figure 1 is designed to operate at three thousand pounds per square inch (3000 p.s.i.) maximum pressure.

As the pumping mechanism 22 is rotated through a complete rotation, the pistons 54 are universally pivoted slightly with respect to the axes of the cylinders 41, due to the fact that the ball ends 55 are slightly closer to the axis of rotation when the pistons are at the opposite ends of their strokes, than when the pistons are in between the stroke ends. The ball ends are at their maximum distances from the axis of rotation at the points 90° removed from the positions of top dead center and bottom dead center. Ordinarily the construction and arrangement of swash plate pumps are such that the total universal pivoting of the pistons is not more than about two degrees at maximum swash plate angle.

In order to vary the displacement of the pump, any suitable means may be employed (not shown). Ordinarily such means are operatively connected to the tiltable displacement control ring 34.

Utilization of the constant velocity universal joint 38 insures that the piston socket ring rotates at a constant velocity with respect to the drive shaft 48, regardless of the angle between the plane of the swash plate assembly and the drive shaft. Use of an ordinary or Cardan type of universal joint is undesirable due to the periodic acceleration and deceleration of the driven member which occur twice during each complete rotation of the driving member.

The piston head portion 56 of the pistons 54 according to the present invention is shown in detail in Figure 2. The head includes an integral annular flange 60 providing a radial annular shoulder 61 against which a guide or support ring 62 is seated. The guide ring 62 is tightly fitted on an integral shank or stub shaft 63 and there is no play between the guide ring and the shank. A clamping ring 64 is closely fitted on the shank 63 outward of the guide ring 62, and a radial end face 65 of the clamping ring abuts the opposing face of the guide ring. There is no play between the clamping ring and the shank.

A tapered outward end portion 66 of the clamping ring 64 is provided with a pair of aligned apertures 67, 67 whose common axis is perpendicular to the axis of the clamping ring. When the guide ring 62 is in position abutting the shoulder 61 and the clamping ring is in position abutting the guide ring, the apertures 67 are in position for being axially aligned with an aperture 68 extending transversely through the shank 63 perpendicular to the axis of the shank. In order to lock the guide ring 62 and the clamping ring 64 in proper position on the stub shaft, a locking pin 69 is press fitted in the apertures 67 and 68. The locking pin 69 may be solid or may be of rolled sheet metal construction generally referred to as a "rolled pin."

The piston head portion 56 is adapted for receiving a spherically surfaced piston sealing member. To this end an annular groove 70 is formed in the portion of the clamping ring 64 adjacent the guide ring 62. The groove 70 is defined by a cylindrical surface 71, a radial shoulder 72 and the opposed radial surface 73 of the guide ring 62. A piston sealing ring 74, formed of a hard resilient material such as high grade steel or other suitable material, is disposed in the groove 70 and has surfaces adapted for close fitting engagement with the surfaces 71, 72 and 73 of the groove. The groove 70 is slightly wider than the sealing ring 74 by approximately one-thousandth of an inch (.001") so that this total clearance is provided between the ring and the opposite surfaces 72 and 73 of the groove.

According to the present invention the guide ring 62 and the sealing ring 74 are provided with respective segmental spherical outer surfaces or rims 75 and 76. The spherical surfaces 75 and 76 are defined by a diameter substantially the same as the diameter of the cylinder 41, and the surfaces are formed as adjacent segments of the same sphere with the spherical center located such that the circular tangent line with the cylinder 41 is always located on the guide ring surface 75. The position of the spherical center is thus determined by the maximum design angle of universal tilt of the piston 54. The spherical surfaces 75 and 76 are ground so that they are accurate and free from imperfections.

In order to provide for free reciprocation of the piston 54 in the cylinder 41, a very slight clearance of approximately one-half of one-thousandth of an inch (.0005") is provided between the diameter of the guide ring 62 and the diameter of the cylinder 41. For the purpose of eliminating the slight leakage which would be occasioned by the clearance between the guide ring and the cylinder, the sealing ring 74 is split at 77 and the sealing ring is sprung radially outwardly to a free diameter slightly greater than that of the cylinder 41, so that the ring must be contracted radially when the piston head portion 56 is inserted in the cylinder 41. Consequently, the spherical surface 76 of the ring is always in resilient line contact with the cylindrical surface of the cylinder. A slight clearance of approximately one-thousandth of an inch (.001") is provided between the inner diameter of the assembled ring 74 and the diameter of the groove cylindrical surface 71.

When the parts are properly constructed and assembled the only possible leakage must occur through the extremely minute leakage path occurring (if at all) where the split 77 in the sealing ring coincides with the very slight (if any) clearance between the guide ring 62 and the cylinder wall. Thus the theoretical leakage is practically non-existent and this has been borne out in tests.

In operation of the piston of Figure 2 as a pump piston, on the suction stroke of the piston friction between the sealing ring and the cylinder wall causes the sealing ring to move against the shoulder 72 of the groove 70, but the friction force is relatively small so that the ring is free to expand. Consequently, line contact is provided with the cylinder wall completely around the sealing ring periphery in preparation for the pumping or pressure stroke.

As the piston reverses in direction at the start of the pressure stroke, the frictional drag of the sealing ring against the cylinder wall moves the ring away from the shoulder 72 and against the surface 73 of the guide ring 62. The pressure which immediately builds up in front of the piston head portion is communicated by means of the clearaces to all of the surfaces of the sealing ring except that against the surface 73 of the guide ring, and the pressure against the front surface of the ring causes an unbalance which immediately pressure-clamps the ring firmly against the guide ring surface 73. As a result, the sealing ring is pressure-locked against the guide ring with the sealing ring in complete line contact sealing engagement with the cylinder wall throughout the pumping stroke. The pressure-locking force is so great that the wedging action of the hydraulic fluid between the sealing ring spherical surface 76 and the adjacent surface of the cylinder wall cannot collapse the ring, and the sealing ring wipes the cylinder wall clean as the piston head advances on the pressure stroke.

The line seal provided by the sealing ring 74 not only provides a practically perfect seal but also eliminates most lubrication problems because of the extremely small, theoretically zero, area of contact.

The spherical rimmed piston ring construction of the present invention prevents piston seizing or scoring when high hydraulic fluid temperatures or sudden changes in temperature are encountered. Due to the large area of surface contact provided by conventional cylindrical piston heads and the close manufacturing tolerances necessary, seizing or scoring occurs whenever the hydraulic fluid temperature causes the piston head to expand an amount greater than the slight clearance provided. In the construction of the present invention initial expansion is absorbed in the closing of the piston ring split or gap. After the gap is closed the ring can expand even further without causing seizing because the spherical outer surface of the ring accommodates expansion by slightly increasing the area of contact with the cylinder wall. In other words, the ring can absorb a certain amount of deformation before the increased expansion of the ring is sufficient to cause scoring. Tests have shown that pistons according to the present invention operate efficiently at considerably elevated temperatures at which comparable conventional pistons seize.

It is readily apparent that the spherical piston rings of the present invention provide considerable wear compensation as a result of the slight spring load. Of course the increased efficiency of lubrication reduces wear.

In addition to the other advantages, pistons according to the present invention provide for universal pivoting of the piston without necessitating incorporation of a separate universal joint between the piston head and the shaft. Conventional piston head and piston rod combinations utilizing universal connections in the piston heads are illustrated in Williams and Janney Patent No. 1,062,071 and Thoma Patent No. 2,155,455.

In order to provide complete hydraulic balancing of the pistons, the ball ends 55 (Fig. 3) are provided with a primary ball segment 78 which has a maximum circumference 79 with a diameter equal to that of the pumping cylinders 41. An axial passage 80 is provided in the piston rod portion 57 and extends through the piston head portion 56 and the ball end portion 55, so that the pressure communicated to the exposed area of the piston head is also communicated to the exposed area of the primary ball segment 78. Since the maximum diameter of the piston head portion is equal to the maximum diameter of the primary ball section, the effective pressure areas are the same, and the piston is completely hydraulically balanced on the pressure stroke of the piston.

Conventional pistons with universally connected heads can never be completely pressure balanced because the universal ball in the piston head must be smaller than the piston head diameter. Thus, there is always an unbalanced thrust against this ball on the pressure stroke of the piston, and since the universal movement is slight, the problem of lubrication of this joint is acute. The construction of the present invention completely eliminates the need for this type of universal connection and thus simplifies and reduces the cost of the construction. Piston life is increased and at the same time complete pressure balance is provided.

The universal ball portion 55 of the piston 54 is improved over the conventional full ball design as illustrated in the two patents referred to above. As distinguished from a full ball end having the same diameter as the piston cylinder, the primary ball segment 78 has a spherical diameter larger than the cylinder diameter, but the total surface of the ball is less than a hemisphere. Thus, a relatively flatter surface is provided with the same effective pressure area for the purpose of maintaining hydraulic balance.

In order to maintain the ball end 55 seated within the socket 58 on the suction stroke of the piston, a smaller diameter secondary ball segment 78a is provided and an annular relief groove 78b is formed between the two ball segments. The secondary ball has a spherical diameter considerably smaller than the diameter of the cylinder. This secondary ball is seated against a secondary socket member 59a which is fixedly secured over the ball socket liner 59 and has an internal segmental spherical surface 58a which matches that of the secondary ball 78a. The segmental balls 78 and 78a have a common center so that the ball end 55 is universally pivotally secured within the socket 58 and is retained therein during both directions of movement of the piston.

Several advantages are afforded by the ball end construction 55. This type of ball end is considerably reduced in weight from the conventional type so that inertia and centrifugal forces are smaller resulting in reduced wear. Since the ball end of the present invention is somewhat smaller than a comparable size conventional full ball end, the space requirements are reduced. The improved ball end is considerably easier to lubricate since the area of contact is reduced and the two ball portions are split to provide a lubricant reservoir in the groove 78b and within the unfilled portion of the socket 58. As an additional advantage the improved ball end construction provides partial pressure balance on the suction stroke of the piston. Slight leakage is provided around the primary ball 78 on the pressure stroke so that a residual pressure will remain in the lubricant reservoir. Since the ball segment 78 is considerably larger in diameter than the ball segment 78a, a substantial pressure area differential is provided. The pressure in the lubricant reservoir acts against this differential area to reduce the force acting on the ball portion 78a on the suction stroke.

It is readily apparent that pistons according to the present invention are much lighter than conventional pistons of comparable capacity. In axial swash plate devices this factor becomes very important in regard to piston and cylinder wall wear, particularly when coupled with the effect of hydraulic unbalance. For example, in a typical swash plate installation utilizing conventional pistons seven tenths of an inch (0.7") in diameter and operated at nine thousand revolutions per minute (9,000 r.p.m.) with a working pressure of fifteen hundred pounds per square inch (1,500 p.s.i.), the load against the piston wall due to centrifugal force amounts to three hundred and forty five pounds (345) and the load against the piston wall due to hydraulic unbalance amounts to two hundred and fifty (250) pounds giving a total force of five hundred and ninety five pounds acting against the piston wall. At the same time the piston socket load amounts to two hundred and eighty five pounds (285).

When pistons according to the present invention are substituted in the same swash plate device the only load against the piston wall is that due to centrifugal force amounting to sixty seven (67) pounds. There is no force due to hydraulic unbalance and no piston socket load because the piston is in complete hydraulic balance and no piston socket is required.

Another embodiment of the invention is illustrated in Figures 4 and 5. This embodiment is generally designated by the reference numeral 54a and utilizes the same universal ball end 55 and shank 57 as the piston member 54. The piston head portion of this embodiment is designated by the reference numeral 56a and includes a flange 60, a shoulder 61, a shank 63 with transverse apertures 68 therethrough, and locking pin 69. The axial passage 80 extends through the shank 57 and through the head portion 56a in the same manner as in the first embodiment.

In the embodiment of Figures 4 and 5 a clamping ring 64a is slidably disposed on the shank 63 with a pressure-tight sliding clearance of approximately three ten-thousandths of an inch (.0003") being provided to permit sliding on the shank but to prevent leakage between the shank and the ring. Transverse apertures 67a are formed through the reduced diameter nose portion of the clamping ring 64a for receiving the ends of the pin 69 to retain the clamping ring on the shank, but a clearance of approximately one thousandth of an inch (.001") is provided between the pin and the walls of the apertures, so that limited axial shifting of the clamping ring is permitted.

The clamping ring 64a is provided with an annular groove 70a which is defined by a cylindrical surface 71a and a radial shoulder 72a. An auxiliary ring 62a is closely fitted on the shank 63 between the clamping ring 64a and the flange 60 and abuts the shoulder 61. The outside diameter of the auxiliary ring is substantially smaller than that of the piston cylinder 41. A split piston sealing ring 81 and a solid piston sealing ring 82 are disposed in close fitting slidable relation on the cylindrical surface 71a of the groove 70a. The ring 81 is provided with a segmental spherical outer surface or rim 83 and the ring is split at 84. The sealing ring 81 is sprung radially outwardly so that its free diameter is slightly larger than the diameter of the piston cylinder 41. When the ring is assembled in the cylinder as shown, it will resiliently bear against the walls of the cylinder. A clearance of approximately one thousandth of an inch (.001") is provided between the ring and the cylindrical surface 71a when the ring is disposed on the clamping ring 64a within the cylinder 41.

The solid sealing ring 82 is not split and is closely fitted to a pressure tight sliding clearance of approximately three tenths of one thousandth of an inch (.0003") with respect to the cylindrical surface 71a. A segmental spherical outer surface or rim 85 is formed on the solid ring 82 and a slight clearance of approximately five tenths of one thousandth of an inch (.0005") is provided between the maximum diameter of the ring and the diameter of the piston cylinder 41.

The respective segmental spherical surfaces 83 and 85 of the rings 81 and 82 are formed as adjacent portions of the same sphere and the normal line of tangency with the cylinder wall occurs at the outer edges of the abutting surfaces of the rings.

The parts are so constructed and located in the embodiment of Figures 4 and 5 that a substantial annular clearance is provided between the clamping ring 64a and the auxiliary ring 62a to provide a vent chamber 86. The combined width of the rings 81 and 82 is such that they are free on the clamping ring 64a when the ring is moved against the pin 69 away from the auxiliary ring 62a, but when the clamping ring is moved in the other direction the two sealing rings are clamped between the shoulder 72a and the upper edge portion of the auxiliary ring 62a. A vent aperture 87 is formed through the auxiliary ring and communicates with the vent chamber 86 so that this chamber is relieved to the low pressure of the pump casing.

An annular undercut groove 88 is formed in the clamping ring at the juncture of the cylindrical surface 71a and radial shoulder 72a under the split ring 81 to insure that the pressure beneath the split ring is the same as the pressure against the spherical surface 83.

In the embodiment of Figures 4 and 5 the piston head portion may be supported in the cylinder by the split ring 81 or the solid ring 82, or both, depending on the attitude of the piston.

The embodiment of Figures 4 and 5 operates in generally the same manner as the embodiment of Figure 2 except that a positive clamping of the sealing ring is provided regardless of whether the piston is utilized in a pump or in a hydraulic motor. Whenever a pressure builds up ahead of the piston, the clamping ring is positively urged against the split ring 81, which in turn is urged against the solid ring 82, which in turn engages the stationary auxiliary ring 62a, so that the two rings 81 and 82 are clamped between the clamping ring and the auxiliary ring.

Since the vent chamber 86 is always relieved to the casing pressure, the clamping action will occur regardless of the position of either of the rings 81 and 82 at the instant the pressure builds up ahead of the piston. Thus, if the piston is being operated in a hydraulic motor where the split ring 81 is moved by friction with the cylinder wall against the shoulder 72a as the power stroke is begun, there is no possibility of hydraulically balancing the piston ring on all four sides as could possibly occur in the embodiment of Figure 2. If the Figure 2 embodiment is utilized in a hydraulic motor and the various close tolerances are not strictly adhered to, the pressure which builds up ahead of the piston could be communicated between the sealing ring 74 and the guide ring 62 to prevent proper pressure clamping.

A third embodiment of the piston according to the present invention is illustrated in Figures 6 and 7. In this embodiment the piston is generally designated by the reference numeral 54b and includes a shaft 57, a flange 60, a shoulder 61, and an axial aperture 80, corresponding to the same portions of the previous embodiments. A piston head portion 56b includes a stub shaft or shank 90 which is similar to the shanks 63 in the previous embodiments with the exception that the outward portion is provided with threads 91. An auxiliary ring 92 is tightly fitted on the shank 90 against the shoulder 61, and a clamping ring 93 is disposed on the end of the shank and secured thereto by means of internal threads 94 which mate with the threads 91 on the shank. The clamping ring 93 bears tightly against the auxiliary ring 92.

An annular groove 95 is formed around the outer portion of the clamping ring 93. This groove is defined by a cylindrical surface 96 and a radial shoulder 97 on the clamping ring and by the outer portion of the auxiliary ring 92 providing a radial annular shoulder 98. An annular sealing spring 99 is wrapped about the cylindrical surface 96 and substantially covers the surface. A pair of split sealing rings 100 and 101 are disposed on the sealing spring 99, and the combined widths of the rings are approximately one-thousandth of an inch (.001") less than the distance between the radial shoulders 97 and 98. The ring 100 is split at 102 and the ring 101 is split at 103, and both rings are provided with respective segmental spherical surfaces or rims 104 and 105 formed as adjacent segments of the same sphere with the normal line of tangency with the cylinder 41 occurring at the outer edges of the abutting surfaces of the rings. The two sealing rings are slightly sprung radially outwardly so that when they are in place in the cylinder they bear resiliently against the cylinder wall. A total maximum clearance of approximately one thousandth of an inch (.001") is provided between the sealing spring 99 and the surface 96.

In order to prevent communication between the ring gaps 102 and 103, the sealing spring 99 is split at 106 and the ends are bent radially outwardly a slight amount to form lips 107, 107 which are arranged to engage in mating slots 108, 108 formed in the adjacent inner surfaces of the sealing rings 100 and 101. The grooves 108 are positioned so that the sealing ring splits 102 and 103 are positioned diametrically oppositely as shown.

A pressure port 109 is provided through a portion of the clamping ring 93 and communicates between the portion of the cylinder 41 ahead of the piston and an annular relief groove 110 formed in the surface 96 at the juncture with the shoulder 97.

The embodiment of Figures 6 and 7 operates in the same general manner as the previously described embodiments. As was the case with the embodiment of Figures 4 and 5, this embodiment will operate equally well in a hydraulic pump or a hydraulic motor. If the piston of the present embodiment is utilized in a pump, the sealing rings will bear against the auxiliary ring shoulder 98 as the piston moves forwardly on the pump stroke due to friction with the cylinder wall, so that, as the pressure builds up ahead of the piston, the two rings will be pressure clamped against one another and against the shoulder. As the piston moves back on the suction stroke, the sealing rings are released to insure free, resiliently urged sealing contact with the cylinder wall, so that a perfect seal will be provided as the piston again moves on the pressure stroke to pressure clamp the rings in their expanded sealing positions.

The embodiment of Figures 6 and 7 works equally well as a motor piston because the split 103 of the ring 101 will vent to the casing any pressure which might otherwise tend to build up between the rings or between the ring 101 and the shoulder 98. In addition, the auxiliary ring 92 is substantially smaller in diameter than the cylinder 41, so that a substantial portion of the rear face of the sealing ring 101 is always vented to casing pressure to insure a pressure unbalance as pressure builds up ahead of the piston. Thus, the rings will be pressure clamped against the shoulder 98 as pressure builds up ahead of the piston even if the rings are initially urged by friction against the shoulder 97 of the clamping ring.

A fourth embodiment of the piston head construction is illustrated in Figures 8 and 9. The piston of this embodiment is generally designated by the reference numeral 54c and is provided with a head portion 56c. As in the previous embodiments, an annular flange 60 and an annular shoulder 61 are provided, and, in this case, a threaded shank 90. An auxiliary ring 115 is closely fitted on the shank 90 and bears against the shoulder 61. This ring is provided with a segmental spherical surface or rim 116 with approximately one-half of one thousandth of an inch (.0005") clearance being provided between the maximum diameter of the auxiliary ring and the diameter of the cylinder 41. A clamping ring 117 is threadedly disposed on the end portion of the shank 90 and bears firmly against the auxiliary ring 115.

An annular groove 118 is formed on the clamping ring 117 and is defined by a cylindrical surface 119 and a radial shoulder 120 on the clamping ring and by a radial shoulder 121 defined by the upper edge portion of the auxiliary ring 115. A split sealing ring 122 is disposed in the groove 119 and a total clearance of approximately one thousandth of an inch (.001") is provided between the side edges of the sealing ring and the opposed shoulders 120 and 121. The sealing ring 122 is formed with a segmental spherical outer surface 123 which is a continuation of the spherical surface 116 of the normal auxiliary ring. The normal line of tangency with the cylinder 41 is always on the surface 123. The sealing ring is split at 124 and the gap is enlarged at 125 to loosely receive a pin 126 which has a portion fixedly secured in an aperture 127 formed in the auxiliary ring 115. The pin 126 serves to keep the ring split 124 in the radial position shown.

An incomplete annular pressure relief groove 128 is formed in the outer edge portion of the radial shoulder 121. The relief groove 128 is formed so that it does not communicate with the sealing ring split 124. If desired, a small vent port 129 may be formed through the outer ring portion of the auxiliary ring 115 to communicate casing pressure to the vent groove 128.

The embodiment of Figures 8 and 9 operates generally in the same manner as the embodiments previously described. A large portion of the surface behind the sealing ring 122 is positively vented to the low casing pressure through the slight clearance between the guide ring surface 116 in the wall of the piston chamber and through the vent passage 129, so that whenever pressure builds up ahead of the piston, this pressure will clamp the sealing ring against the auxiliary ring. Since the sealing ring bears resiliently against the walls of the piston chamber and since the ring is freed on the suction or return stroke of the piston, this embodiment will work equally well in a pump or a hydraulic motor.

In Figure 10 is illustrated a fifth embodiment of the improved piston head construction of the present invention. The piston of this embodiment is generally designated by the reference numeral 54d, and includes piston rod 57 and a piston head portion 56d. The piston head portion is provided with an annular flange 60, an annular shoulder 61, and a threaded stub shank 90. An auxiliary ring 130 is tightly fitted on the shank 90 and abuts the shoulder 61. An annular groove 131 is formed in the outer edge portion of the auxiliary ring and is defined by a cylindrical surface 132 and a forwardly facing radial shoulder 133. A split piston sealing ring 134 is seated in the groove 131 and is provided with an outer segmental spherical surface or rim 135 and a piston split 136.

As is the case with the piston sealing rings previously described, the spherical surface 135 of the ring 134 is of the same diameter as the piston chamber 41, and the ring is sprung radially outwardly slightly so that its spherical surface will bear resiliently against the piston chamber wall. The spherical surface 135 is arranged so that the line of tangency between the surface and the chamber wall is always short of the forward edge of the piston ring as long as the piston does not tilt more than the maximum design amount.

In the embodiment of Figure 10, an annular cup spring 137 is disposed on the shank 90 and has its inner radial edge portion clamped against the auxiliary ring 130 by means of a nut 138 which is threadedly attached to the shank. This causes the radially outer edge portion of the cup spring to bear resiliently against the forward edge of the sealing ring 134 to resiliently urge the ring against the shoulder 133 of the auxiliary ring 130. The cup spring 137 is constructed so that its radially outer edge clears the piston cylinder wall by approximately one-thousandth of an inch (.001") on its diameters, so that the possible leakage path through the split 136 of the sealing ring is negligible. The resilient force with which the cup spring 137 urges the sealing ring against the shoulder 133 is arranged to be slightly less than the friction force between the sealing ring and the wall of the piston chamber so that the ring is freed from the shoulder 133 on each suction stroke of the piston.

The embodiment of Figure 10 operates in substantially the same manner as the previously described embodiments with the exception that auxiliary mechanical means in the form of the cup spring are utilized to urge the sealing ring to seated position. Since a substantial portion of the area behind the sealing ring is exposed to the low casing pressure, the ring will always be pressure locked in perfect sealing position whenever pressure builds up ahead of the piston. Thus, this embodiment of the invention will operate as well in a hydraulic motor as in a pump.

A sixth embodiment of the invention illustrated in Figure 11 is identical to the embodiment shown in Figures 4 and 5 with the exception that the two sealing rings 81 and 82 of the earlier embodiment are replaced by two split sealing rings 140 and 141 with a narrow support or guide ring or disk 142 disposed therebetween. The rings 140 and 141 and the disk 142 are provided with respective segmental spherical outer surfaces or rims 143, 144 and 145 having a spherical diameter the same as the diameter of the piston chamber 41. These spherical surfaces are arranged so that the line of tangency always remains on the spherical surface 145 formed on the supporting disk 142, within the design maximum universal tilt of the piston.

The sealing rings 140 and 141 are split at 146 and 147, respectively, and the rings are sprung radially outwardly slightly, but the support disk 142 is solid. The support disk is fitted on the clamping ring 64a with a pressure tight sliding clearance of approximately three ten thousandths of an inch (.0003") on the diameter, and the maximum outer diameter of the disk is provided with approximately five ten thousandths of an inch total clearance with respect to the diameter of the cylinder 41.

The embodiment of Figure 11 operates in exactly the same manner as that of Figures 4 and 5 with the exception that the piston head portion is always supported by the support disk 142 rather than one or the other of the sealing rings.

In Figure 12 is illustrated a seventh embodiment of the invention providing a double piston head for use in hydraulic pumps developing a relatively high pressures such as five thousand pounds per square inch (5000 p.s.i.). In this embodiment a piston, generally designated by the reference numeral 150, includes a double shank portion 151, a universal ball end portion 152, and a double head portion 153.

The universal ball end portion 152 includes a segmental spherical end surface 154, which is slightly less than a hemisphere, with a spherical diameter slightly larger than that of a piston cylinder 156 within which the head portion 153 is reciprocably disposed. The maximum diameter of the ball end 152 defined by the circumference 155 is equal to the diameter of the cylinder 156. Pressure ahead of the piston head is communicated through an axial passage 157 which extends through the piston head portion 153, through the piston rod portion 151, and through a connecting axial passage 158 in the universal ball end 152, so that the piston 150 is hydraulically balanced on its pressure stroke.

The piston head portion 153 includes a front piston head 159 and a rear piston head 160. Each of the piston heads includes a support portion 161 with an integral guide flange 162 and a reduced diameter integral stub shank portion 163. Each stub shank portion 163 is formed with a cylindrical surface 164 and each support ring portion 162 is provided with a radial forwardly facing shoulder 165. On each of the cylindrical surfaces 164 a split piston sealing ring 166 is closely fitted and adapted to engage the respective shoulders 165. The sealing rings 166 are split at 167. For retaining the rings in proper position, snap rings 168, 168 are disposed in respective grooves 169, 169 formed in the stub shanks 163 just forwardly of the sealing rings. The parts are constructed so that a clearance of approximately one thousandth of an inch (.001") is provided between the side faces of the sealing rings 166 and the respective distances between the snap rings 168 and the shoulders 165.

The respective guide portions 162 and sealing rings 166 are provided with segmental outer spherical surfaces or rims 170, 170 and 171, 171. These spherical surfaces are formed as adjacent portions of the same sphere with a diameter the same as that of the cylinder 156 and with the normal line of tangency occurring at the juncture between the surfaces. As is the case with the previous embodiments a clearance of substantially five ten thousandths of an inch (.0005") is provided between the maximum diameter of the guide portion 162 and the diameter of the piston cylinder.

In order to permit limited relative movement between the heads 159 and 160, the piston rod portion 151 is formed of two concentric sections, an outer section 172, which is integrally connected to the universal ball portion 152 at one end and to the head 160 at the other end, and an inner relatively resilient tubular section 173, which is integrally connected to the head 159. The opposite end of the tubular section 173 is provided with a hemispherical ball end 174 which fits in a mating ball socket 175 formed within the universal ball end 152. The centers of the ball end spherical surface 154 and the spherical socket 175 coincide.

The embodiment of Figure 12 operates in substantially the same manner as the previous embodiments, and particularly the embodiment of Figure 2, with the exception that a double sealing action is obtained. Relative movement between the heads 159 and 160 to accommodate slight universal pivoting of the piston is achieved through slight resiliency in the long thin tubular section 173 and through slight universal movement of the ball end 174 in the socket 175.

In Figure 13 is illustrated a wobble plate hydraulic device utilizing improved pistons of the present invention. In this figure the pumping mechanism of a wobble plate pump 180 is illustrated. The pump includes generally a pump cylinder casing 181, a wobble plate assembly 182, and valve mechanism 183.

The pump cylinder casing 181 is provided with a plurality of pumping cylinders or chambers 184 circumferentially arranged in a manner similar to those in the swash plate pump of Figure 1. However, the cylinder casing 181 is not rotatable as is the cylinder block 33.

A plurality of pistons 185 have their head portions 186 disposed in pumping relation within the respective cylinders. The head portions 186 may be constructed in accordance with any of the described embodiments. The pistons are provided with elongated cylindrical shanks or rods 187 which are shiftably supported in respective elongated sleeves 188. Mushroom ends 189 having segmental spherical end surfaces 190 are formed on the shanks 187 opposite to the piston head portions 186.

Since the pistons 185 do not universally tilt in the cylinders, it is not always necessary that the piston rings be spherically surfaced as described in connection with the previous embodiments, although the provision of spherical surfaces is advantageous for the other reasons explained. For example, the rings in the present embodiment could be flat rimmed or could have rims with other types of curvature. In such instances the pressure clamping feature would still be provided to achieve superior sealing and to supply pistons with head portions embodying chiefly a narrow pressure-clamped ring or rings.

The wobble plate assembly 182 includes a piston actuating ring 191 which is rotatably mounted inside a wobble ring 192 by means of an anti-friction thrust bearing 193 and an anti-friction roller bearing 194. The wobble ring 192 is adapted for being rotated while being held in its oblique position as shown so that the ring performs a rotary oscillation or wobbling movement. As the ring 192 is wobbled, the piston ring 191 is also wobbled causing reciprocation of the pistons 185 in the same manner that the pistons are reciprocated in the embodiment of Figure 1 with the exception that the piston casing, pistons and piston rings do not rotate. The wobble ring 192 may be rotated in any desired manner such as by pivotally connecting the ring to a pump drive shaft 195. Through the pivotal connection (not shown) the angle of tilt of the wobble plate assembly may be changed to change the displacement of the pump.

The valve mechanism 183 controls the flow of hydraulic fluid to and from the cylinders 184 as the pistons are reciprocated. A face valve plate 196 of the valve mechanism 183 is rotatably connected to an eccentrically located cam journal 197 by means of a hub 198. The journal 197 is integrally connected to the drive shaft 195 so that the valve plate is radially oscillated at the same speed as the wobble ring 192. The hub 198 of the valve plate is connected by means of an apertured web 199 to a port control ring 200, which is arranged to control communication between the piston cylinders 184 and an annular hydraulic inlet port 201 and a central hydraulic outlet port 202. Since the valve plate is mounted eccentrically and shifts axially in a circular path at the speed that the wobble ring rotates, the control ring connects cylinders with pistons on the suction stroke to the inlet port 201 and cylinders with pistons on the pressure stroke to the outlet port 202.

The significant difference between the wobble pump construction of Figure 13 and the axial swash plate construction of Figure 1 is the elimination of rotation and of universal pivoting of the pistons. The pistons of the present embodiment are not subjected to centrifugal force and the piston rods do not pivot universally in the cylinders. However, piston head portions according to the present invention are advantageously used in a wobble plate pump for the other purposes discussed earlier.

It is readily apparent that the pump construction of Figure 13 may be operated by holding the casing 181 stationary and wobbling the plate assembly 182 as described or by holding the ring 192 stationary and rotating the casing in the manner of a swash plate pump. In either case the pistons 185 do not pivot universally since they are guided by the sleeves 188, and they are not universally pivotally connected to the actuating ring 191.

From the foregoing description it will be readily apparent that the present invention provides substantially improved piston members in which conventional piston heads are replaced by segmental spherical members to substantially increase the efficiency of the pistons and to reduce their overall weight. Such improved pistons are particularly well adapted for use in hydraulic devices such as axial swash plate or wobble plate pumps or motors.

Variations and modifications may be effected without departing from the scope of the novel concepts of the present invention.

I claim:

1. An improved piston adapted for reciprocation in a cylinder and comprising a rod portion, a head portion connected to said rod portion, a guide member secured to said head portion and having an outer guide surface with a diameter substantially equal to the diameter of the cylinder, and a piston ring disposed about said head portion adjacent said guide member, said piston ring having a segmental spherical outer surface with a spherical diameter substantially equal to the diameter of the cylinder.

2. A piston comprising a rod portion, a piston ring carried by said rod portion and having a segmental spherical rim the spherical diameter of which is substantially equal to the maximum diameter of the ring, and means retaining said ring on said rod portion and permitting radial expansion and contraction and slight radial shifting of the ring relative to the rod.

3. A piston according to claim 2 wherein said piston ring is split to accommodate radial expansion and contraction of the ring.

4. In a piston adapted for reciprocation in a cylinder, a piston rod, means defining a radial annular shoulder on said rod, a split piston ring axially shiftably disposed on said rod adjacent said shoulder, said piston ring having an outer segmental spherical surface with a spherical diameter substantially equal to the diameter of the cylinder and having a free maximum diameter slightly greater than the diameter of the cylinder, a guide member secured to said rod adjacent said ring and having an outer guide surface with a diameter substantially equal to the diameter of the cylinder, whereby said ring is adapted for being pressure clamped against said shoulder while the segmental spherical surface of the ring is resiliently maintained in sealing contact with the wall of said cylinder.

5. An improved piston comprising a rod portion, a head portion formed at one end of said rod portion, means providing an annular radially outwardly open groove around said head portion, and a piston ring disposed in said groove and having side and inner circumference surfaces conforming with the means defining said groove but with a slight clearance therebetween, said piston ring having a radially outward segmental spherical surface with a spherical diameter substantially equal to the maxium diameter of the ring.

6. In a piston adapted for reciprocation in a cylinder, a piston rod, means defining a radially annular shoulder on said rod, means defining a cylindrical surface on said rod adjacent said shoulder, and a piston ring disposed on said cylindrical surface and adapted for being pressure-clamped against said shoulder, said piston ring having a diameter at least as great as the maximum diameter of said shoulder and having a segmental spherical rim with a spherical diameter substantially the same as the diameter of the cylinder.

7. A piston comprising a rod portion, a piston head portion attached to said rod portion, a piston ring disposed about said head portion and having a segmental spherical rim, the spherical diameter of which is substantially equal to the maximum diameter of the ring, and means retaining said ring on said head portion and accommodating limited axial shifting of the ring.

8. In a piston adapted for reciprocation in a cylinder, a piston rod, a radially expandible piston ring formed of resilient material and having an outer segmental spherical surface with a spherical diameter substantially equal to the diameter of the cylinder, said ring having a maximum diameter slightly greater than the diameter of the cylinder, and means retaining said ring on said rod and permitting radial expansion and contraction and slight radial shifting of the ring relative to the rod.

9. In a piston adapted for reciprocation and limited universal pivoting in the cylinder, said piston having a head portion, means defining an annular shoulder on said piston head portion, a piston ring axially shiftably disposed about said piston head portion and adapted for engagement with said shoulder, said piston ring having an axial split formed therethrough, and means for preventing leakage through the split formed in said piston ring, said piston ring having a segmental spherical outer surface with a spherical diameter substantially equal to the diameter of said cylinder and being expanded slightly radially providing a maximum free diameter slightly greater than the diameter of said cylinder, whereby the segmental spherical surface of said piston ring is resiliently urged into sealing contact with the wall of said cylinder and whereby said piston ring is adapted for being pressure locked in its resilient sealing contact with the wall of said cylinder while accommodating limited universal pivoting of said piston during reciprocation thereof.

10. In a piston adapted for reciprocation in a cylinder, a piston rod, a piston guide ring secured on said rod, a piston sealing ring disposed adjacent said guide ring, and means supporting said sealing ring on said piston rod adjacent said guide ring, said guide ring and said sealing ring having segmental spherical outer surfaces formed as adjacent portions of the same sphere with the spherical diameter substantially equal to the diameter of said cylinder and with said segmental spherical surfaces adapted for engagement with the wall of said cylinder, whereby said spherical surfaces accommodate limited universal pivoting of said piston while providing a piston seal.

11. A piston according to claim 10 wherein the normal line of tangency between the cylinder wall and said segmental spherical surfaces occurs on the spherical surface formed on said guide ring, within the limited range of universal pivoting of said piston.

12. A piston according to claim 10 wherein said sealing ring is split axially and wherein the line of tangency between the wall of said cylinder and said segmental spherical surfaces occurs on the spherical surface formed on said sealing ring, within the limited range of universal pivoting of said piston, and including means for preventing leakage through the split in said sealing ring.

13. A piston adapted for reciprocation in a cylinder and comprising a piston rod, an integral annular shoulder formed on said piston rod, a solid piston guide ring disposed about said rod in engagement with said shoulder, a clamping ring secured on said rod against said guide ring and retaining said guide ring in a fixed position on said rod, said clamping ring having an annular groove formed therein adjacent the radially outer edge portion of said guide ring, and a split piston sealing ring disposed in said annular groove in close fitting relationship with the defining surfaces of the groove and with the radially outer edge portion of said guide ring, said guide ring and said sealing ring having outer segmental spherical surfaces formed thereon as adjacent portions of the same sphere with the spherical diameter substantially the same as the diameter of said cylinder, said sealing ring being formed with a maximum free diameter slightly larger than the diameter of said cylinder, whereby said sealing ring is adapted for being pressure-clamped against said guide ring with the spherical surface of the sealing ring in sealing contact with the wall of said cylinder.

14. In a piston adapted for reciprocation in a cylinder, a piston rod, means defining a radial annular shoulder on said rod, and a pair of spherically rimmed piston rings axially shiftably disposed about said rod adjacent said shoulder whereby said rings are adapted for being pressure-clamped against said shoulder.

15. A piston according to claim 14 wherein the spherical rims provided on said piston rings are formed as adjacent segmental portions of the same sphere with a spherical diameter substantially the same as the diameter of the cylinder, and wherein one of said rings is solid and the other of said rings is split axially.

16. A piston according to claim 14 wherein the spherical rims on said rings are formed as adjacent segments of the same sphere with the spherical diameter substantially the same as the diameter of said cylinder, both of said rings having axial splits formed therein, and means preventing communication between said ring splits.

17. In a piston adapted for reciprocation in a cylinder, means defining a radial annular shoulder on said piston, a piston ring axially shiftably disposed on said piston adjacent said shoulder, and means responsive to fluid pressure for pressure clamping said ring against said shoulder.

18. A piston according to claim 17 wherein said means responsive to fluid pressure comprise a clamping ring axially shiftably disposed on said piston adjacent said piston ring, said clamping ring having differential pressure area means whereby the effective area adapted for pressure-biasing said clamping ring away from said piston ring is smaller than the effective area adapted for pressure biasing said clamping ring against said piston ring.

19. In a piston adapted for reciprocation in a cylinder, a piston rod, a ring member fixedly secured on said rod, a clamping ring disposed on said rod adjacent said ring member, means securing said clamping ring on said rod to permit limited axial shifting of the clamping ring relative to said ring member, said clamping ring having an annular shoulder formed thereon, and a pair of sealing rings disposed on said clamping ring and adapted to be clamped between said ring member and said clamping ring shoulder when said clamping ring is moved toward said ring member and adapted for releasing said sealing rings when said clamping ring moves in the opposite direction, said sealing rings having segmental spherical outer surfaces formed as adjacent segments of the same sphere with a spherical diameter substantially the same as the diameter of the cylinder.

20. A piston according to claim 19 wherein the sealing ring adjacent said ring member is solid and the other sealing ring is axially split.

21. A piston according to claim 19 wherein means are provided venting the effective area of said clamping ring facing said ring member to the pressure on the opposite side of said ring member.

22. A piston according to claim 19 wherein both of said sealing rings are split axially, and a solid guide ring disposed therebetween with the outside surfaces of said sealing rings and said guide ring being formed as adjacent segmental portions of the same sphere with the line of tangency between the segmental spherical surfaces and the wall of the cylinder always lying on the spherical surface formed on said solid guide ring.

23. In a piston adapted for reciprocation in a cylinder, a piston rod, a piston guide ring secured on said rod, a split piston sealing ring disposed adjacent said guide ring, means supporting said sealing ring on said piston rod adjacent said guide ring, means venting a portion of the area of said sealing ring facing said guide ring to the pressure on the other side of said guide ring, blocking means disposed at a particular circumferential portion of said guide ring, and means retaining said sealing ring in a particular circumferential position with the split in the sealing ring adjacent said blocking means for preventing communication between the split in said sealing ring and said venting means, said guide ring and said sealing ring having segmental spherical outer surfaces formed as adjacent portions of the same sphere with the spherical diameter substantially equal to the diameter of said cylinder and with said segmental spherical surfaces adapted for engagement with the wall of said cylinder, whereby said spherical surfaces accommodate limited universal pivoting of said piston while providing a piston seal.

24. In a piston adapted for reciprocation in a cylinder, a piston rod, means defining an annular shoulder on said rod, a split piston ring disposed about said rod adjacent said shoulder defining means, and means associated with said piston ring and responsive to fluid pressure for clamping said piston ring against said shoulder defining means.

25. A piston according to claim 24 wherein said means responsive to fluid pressure comprise structure including a pressure unbalance area providing a pressure unbalance force against said piston ring whereby said ring is pressure-clamped against said shoulder when the pressure against the side of said piston ring opposite to said shoulder is greater than the pressure on the opposite side of said shoulder.

26. A piston according to claim 24 wherein said means responsive to fluid pressure comprise a clamping ring axially shiftably disposed on said rod adjacent said shoulder defining means, said clamping ring having differential pressure area means whereby the effective area adapted for pressure-biasing said clamping ring away from said piston ring is smaller than the effective area adapted for pressure biasing said clamping ring against said piston ring.

27. In a piston adapted for reciprocation in a cylinder, a piston rod, an auxiliary ring secured on said rod, a split piston sealing ring disposed adjacent said auxiliary ring, means supporting said sealing ring on said piston rod adjacent said auxiliary ring, and means venting a portion of the area of said sealing ring facing said auxiliary ring to the pressure on the other side of said auxiliary ring.

28. A piston according to claim 17 wherein said means responsive to fluid pressure comprise a pressure unbalance area providing a force sufficient to pressure clamp said ring next to said shoulder to prevent radial displacement of the ring relative to said piston when the pressure against the side of the ring opposite to said shoulder is greater than the pressure on the opposite side of said shoulder.

References Cited in the file of this patent

UNITED STATES PATENTS

| | | |
|---|---|---|
| 394,789 | Patten | Dec. 18, 1888 |
| 580,848 | Currie | Apr. 20, 1897 |
| 1,612,038 | Miller | Dec. 28, 1926 |
| 1,710,567 | Carey | Apr. 23, 1929 |
| 2,148,764 | Maack | Feb. 28, 1939 |
| 2,376,475 | Bush | May 22, 1945 |
| 2,426,108 | Loewe | Aug. 19, 1947 |
| 2,465,510 | Bonnafe | Mar. 29, 1949 |
| 2,495,685 | Beaman et al. | Jan. 31, 1950 |
| 2,610,098 | Reiners | Sept. 9, 1952 |
| 2,658,809 | Schultz | Nov. 10, 1953 |
| 2,710,137 | Arnouil | June 7, 1955 |
| 2,716,971 | Sykes | Sept. 6, 1955 |
| 2,792,790 | Capps | May 21, 1957 |
| 2,815,992 | Rodgers | Dec. 10, 1957 |

FOREIGN PATENTS

| | | |
|---|---|---|
| 761,049 | France | Dec. 27, 1933 |
| 800,418 | France | Mar. 4, 1936 |
| 886,967 | France | July 26, 1943 |